United States Patent [19]

Brännström et al.

[11] 4,045,955
[45] Sept. 6, 1977

[54] REGULATING MEANS FOR GAS TURBINE PLANT

[75] Inventors: Roine Brännström; Goran Nilsson, both of Finspong, Sweden

[73] Assignee: Stal-Laval Turbin AB, Finspong, Sweden

[21] Appl. No.: 711,666

[22] Filed: Aug. 4, 1976

[30] Foreign Application Priority Data

Aug. 29, 1975 Sweden ............................ 7509603

[51] Int. Cl.$^2$ .............................................. F02C 9/06
[52] U.S. Cl. .......................... 60/39.28 R; 60/39.16 R; 60/39.28 T
[58] Field of Search .................. 60/39.28 R, 39.28 T, 60/39.16 R, 39.14, 223; 415/10, 15, 17

[56] References Cited

U.S. PATENT DOCUMENTS

| | | | |
|---|---|---|---|
| 3,295,317 | 1/1967 | Blackaby | 60/39.28 R |
| 3,340,883 | 9/1967 | Peternel | 415/17 X |
| 3,421,317 | 1/1969 | Bedford | 60/39.28 R |
| 3,759,037 | 9/1973 | Kiscaden | 60/223 |
| 3,765,176 | 10/1973 | Nelson | 60/223 |
| 3,832,846 | 9/1974 | Leeson | 60/39.28 R |
| 3,874,167 | 4/1975 | Katsume | 60/223 X |

*Primary Examiner*—Clarence R. Gordon
*Attorney, Agent, or Firm*—Pollock, Vande Sande & Priddy

[57] ABSTRACT

Apparatus for controlling the flow of fuel supplied via a regulating valve to a gas turbine plant having a compressed-gas generating unit and a power turbine which is driven by the gas from the generating unit. The function of the controlling apparatus is to reduce or cut off the supply of fuel in the event of an overspeed condition of the power turbine. The apparatus includes a first means which is responsive to the angular velocity of a rotor in the power turbine, and a second means which is responsive to the angular acceleration of such rotor. The control means is jointly responsive to the output signals provided by the first and second means so as to control the valve and reduce the rotor's angular velocity when the output signals provided by both the first and second means concurrently exceed predetermined values. According to a further embodiment, a fourth means is also provided which is responsive to the power of the compressed gas generating unit, and the control means is additionally responsive to the output signal provided by such fourth means.

10 Claims, 1 Drawing Figure

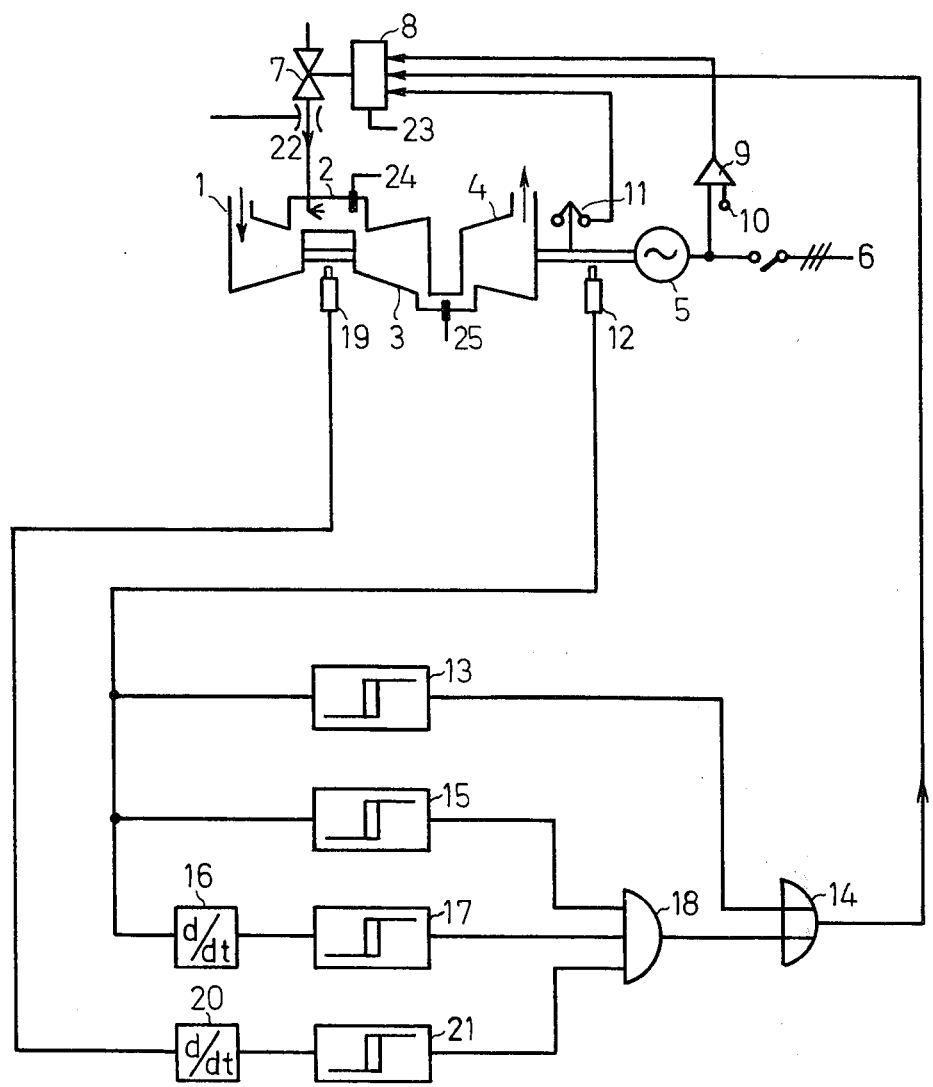

REGULATING MEANS FOR GAS TURBINE PLANT

BACKGROUND OF THE INVENTION

The present invention relates to a regulating system for a gas turbine plant. Such a gas turbine plant generally comprises a compressed-gas generating unit including a compressor, a combustion chamber and a gas turbine which drives the compressor and constitutes a high pressure turbine stage from which waste gases are conducted to a power turbine. In some instances, the compressed-gas generating unit may comprise simply a combustion chamber fed from an air reservoir. In both instances, however, a regulating valve is provided which is controlled by a control means to control the rate of fuel flow so that, in the event of a loss of load on the power turbine, the fuel flow is decreased, if necessary, to a minimum level which is adequate to keep the unit in idling condition.

If the above-described apparatus for control of the regulating valve should fail for some reason, there is then a real risk that the power turbine would race to high speeds which would be injurious to the equipment, and for this reason a gas turbine plant should be provided with some form of emergency stop means which shuts off the supply of fuel if the speed of the turbine reaches a predetermined level above its normal speed. However, to avoid unnecessary tripping of the emergency stop, the speed level at which tripping occurs should not be chosen at too low an increment above its normal value. On the other hand, this latter requirement means that the speed may reach quite a high value before the tripping actually becomes effective to once again reduce the speed. To avoid this situation, and yet provide security against unnecessary tripping of the emergency stopping apparatus, it is proposed according to the present invention to take into consideration not only the speed of the unit but also its derivative which is of course representative of its angular acceleration, since these two quantities together indicate at a very early stage whether there is a risk of overspeed of the unit.

According to a further embodiment of the invention, the condition of the plant can be monitored in an even safer manner if, in addition to responding to the speed and acceleration of the power turbine, the control apparatus also takes into account a working parameter of the gas unit. In this way, it is possible to ascertain whether the fuel regulating means is operating properly, and it also then becomes able quickly to prevent an overspeed condition. Such apparatus is also then effective in the event that the normal fuel regulating apparatus, although not fully inoperable, is nevertheless not fully effective to prevent an overspeed situation from occurring.

BRIEF DESCRIPTION OF THE DRAWINGS

The invention will be described with reference to the accompanying drawing which discloses a gas turbine plant embodying the invention.

DETAILED DESCRIPTION OF THE PREFERRED EMBODIMENTS

The gas turbine plant as shown in the accompanying drawing comprises a compressor 1 from which compressed air is fed to a combustion chamber 2. From the chamber, the hot gases are passed to a high pressure gas turbine 3 which drives the compressor 1. The exhaust gases from the turbine 3 are passed to a power turbine 4 which drives a generator 5 connected to an A.C. network 6.

Fuel is fed into the combustion chamber 2 through a regulating valve 7 which is controlled by a control device 8 which ordinarily includes some form of servomechanism. During normal operation, the control device 8 is controlled by a regulator 9 having two inputs. One of these inputs 10 receives a signal representative of a desired speed of the power turbine, and the other input receives a signal which is representative of the actual speed of the power turbine which may, for example, be obtained from the A.C. network.

To ensure that the power turbine will not race to dangerously high speeds in the event that the regulator does not operate quickly enough in response to a load drop, or does not operate at all, additional emergency trip devices may be provided to close the regulating valve 7 or perhaps to throttle the valve 7 to a minimum fuel flow so that the compressed-gas generating unit comprising elements 1–3 may be maintained in an idling condition.

One manner of providing an emergency trip device is to use a mechanical overspeed regulator 11 which is driven directly by the power turbine shaft. Furthermore, an electric speed counter 12 may be provided in the form of a gear wheel generator or tone generator which is influenced magnetically by a gear rim on the turbine shaft. Under such circumstances, the signal representative of angular speed is fed to a discriminator 13 which, via an OR gate 14, emits a signal to the control device 8 to throttle the regulating valve in the event the turbine speed exceeds a predetermined value. The disadvantage of using such speed-responsive signal emitters 11, 12, and 13 is, as previously mentioned, that their level of tripping must be chosen relatively high in order to prevent unnecessary tripping of the turbine shut-down apparatus, and as a result the power turbine may reach undesirably high angular velocities before the reduction becomes effective.

A quicker and safer tripping of the apparatus may be provided according to the invention by means of signal emitters 15–17. The discriminator 15 is connected directly to the unit 12 and thus provides an output signal to AND gate 18 whenever the frequency-responsive signal to which the unit 12 is responsive exceeds a predetermined value. The unit 16, on the other hand, acts as a differentiator of the signal provided by the unit 12 and thus the discriminator 17 connected to its output provides a signal whenever the derivative of the speed signal provided by unit 12 exceeds a predetermined value to indicate that the speed is increasing at a predetermined rate. Thus, if at the time that the discriminator 15 indicates that the speed is already high, and the output of differentiator 17 indicates that the speed is accelerating at a rate above a predetermined value, then the two output signals of these differentiators 15 and 17 together indicate that the speed of the unit may reach a detrimental value and accordingly the signals from the differentiators 15 and 17 may be used to provide an output signal from AND gate 18 and OR gate 14 to control device 8 so as to throttle the valve 7.

Still better results are obtained by including a further generator 19, differentiator 20, and discriminator 21 so as to produce an even earlier and safer indication of a risk of overspeed. The generator 19 may be of the same type as the unit 12 but is instead situated so as to measure the speed of the compressor parts 1 and 3. The output signal from the generator unit 19 is then differentiated by the differentiator 20 whose output signal is then applied through discriminator 21 to the AND gate 18. Thus, AND gate 18 receives an input from the discriminator 21 whenever the derivative of the speed signal from the generator 19 establishes that the angular deceleration of the compressor is not such as to quickly reduce the angular velocity to a safe value.

The output signal from the differentiator 21, which normally remains at a predetermined value, becomes of importance when the differentiators 15 and 17 simultaneously emit signals to indicate that the speed of the power turbine has reached a predetermined high value and also that it continues to increase at a predetermined high rate. If the regulator 9 operates properly, the valve 7 will already have been throttled, and the turbine 3 driving the compressor 1 will then already be in the process of being slowed down. If this slowing down takes place sufficiently rapidly, i.e. if the derivative of the speed signal provided by differentiator 20 is at an appropriate value relative to the predetermined negative value established by discriminator 21, the output signal from discriminator 21 will disappear and no tripping signal will then be provided over AND gate 18 and OR gate 14 since, in this case, one can be assured that the pressure on the exhaust gases from the unit 3 will drop so rapidly that the power turbine as controlled by regulator 9 is able to be slowed down in time despite an elevated and increasing speed. If, on the other hand, the regulator 9 does not have time to reduce the fuel flow in regulator 7 quickly enough, then the compressor unit 1-3 will also not be reduced in speed sufficiently quickly, and the differentiator 21 will then continue to provide a distinctive output signal. Such output signal will then be combined with the signals from the differentiators 15 and 17 to provide that the AND gate 18 will then provide an output signal to OR gate 14 so that the valve 7 will be throttled.

By considering the different characteristics and time constants of the different parts of the plant, it becomes relatively easy to establish a reasonable threshold value of the various components of the system. For example, the tripping threshold values of the units 11 and 13 should preferably not be set lower than about 112% of the normal speed if unjustified tripping is to be avoided. This means that the speed of the power turbine unit may very well reach speeds as high as 120% of normal speed before the retardation actually becomes effective, and such speed is considered to be undesirably high.

When the discriminators 15, 17, and 21 are employed, the thresold value for the discriminator 15 may be set at 108% of normal speed of the power turbine. The threshold value for the discriminator 17 can then be set for an angular acceleration of 180 rpm per second whereas the threshold value of the discriminator 21 can then be set at —100 rpm per second. If the signal from the differentiator 20 is higher than this value, it should then be assumed that the regulation provided by the regulator 9 will not be effective to reduce the speed of the unit sufficiently rapidly, and accordingly a tripping signal should then be provided.

The compressor unit comprising elements 1-3 in the drawing has been shown as a one-stage unit, in which event only one speed of the unit is capable of being monitored by the generator 19. On the other hand, if the compressor unit is constructed with both high-pressure and low-pressure stages with separate shafts, the generator 19 may be arranged to measure the angular velocity of either of the shafts in the high-pressure and low-pressure stages respectively. As a rule, however, the high-pressure stage which contains the combustion chamber is preferably the one whose rotor shaft is monitored since its reaction is the quickest.

Instead of measuring compressor speed, it is also possible, for example, to measure the fuel flow through the valve 7 by means of a measuring throttle 22 in series with valve 7. Alternatively, the set position of valve 7 can be measured by providing the control device 8 with an output 23 which indicates this position. A further possibility comprises measuring the pressure or the temperature in the combustion chamber by means of a measuring member 24, or the pressure or the temperature of the exhaust gases from the turbine 3 can be measured by means of a member 25. Thus, it is necessary in accordance with the present invention only to connect the discriminator 21 to be responsive to a working parameter for the compressed-gas generating unit so that an indication can be provided as to whether the regulator 9 is operating satisfactorily.

If the compressed-gas generating unit comprises a combustion chamber fed from an air reservoir, it is then suitable to choose as the working parameter for the differentiator 21 the fuel flow through the measuring throttle 22 or the setting of the regulator valve 7.

What we claim is:

1. Apparatus for controlling the flow of fuel supplied via a regulating valve to a gas turbine plant including a compressed-gas generating unit and a power turbine driven by the gas from the compressed-gas generating unit for the purpose of reducing power turbine speed in the event of overspeed comprising:

first means responsive to the angular velocity of a rotor included in said power turbine, second means responsive to the angular acceleration of the power turbine rotor, and third means jointly responsive to output signals provided by said first and second means for controlling said valve to reduce the rotor's angular velocity when said output signals provided by both said first and second means concurrently exceed predetermined values.

2. The apparatus of claim 1 which further includes fourth means responsive to power of said compressed-gas generating unit, said third means being also controlled by the output signal of said fourth means.

3. The apparatus of claim 2 in which said fourth means is responsive to the rate of fuel flow to said gas unit and provides its said output signal when said rate exceeds a predetermined value.

4. The apparatus of claim 2 in which the compressed-gas generating unit comprises a compressor driven by a gas turbine and wherein said fourth means is responsive to the angular speed of a further rotor included in said compressed-gas generating unit, said fourth means providing a distinctive output when the time derivative of said angular speed is of a value corresponding to an angular deceleration of said further rotor which is less than a predetermined value.

5. The apparatus of claim 2 in which said third means is effective to reduce the rotor's angular velocity only when concurrently said output signals of said first, second, and fourth means are present.

6. The apparatus of claim 2 in which said fourth means is responsive to the rate of fuel flow through a valve supplying fuel to said compressed-gas generating unit.

7. The apparatus of claim 6 in which said fourth means is responsive to the setting of said valve.

8. The apparatus of claim 2 in which said fourth means is responsive to the pressure of a combustion chamber included in said compressed-gas generating unit.

9. The apparatus of claim 2 in which said fourth means is responsive to the temperature in a combustion chamber included in said compressed-gas generating unit.

10. The apparatus of claim 2 in which said fourth means is responsive to a parameter of the exhaust gases from the gas turbine included in said compressed-gas generating unit.

* * * * *